(12) United States Patent
Srinivasan et al.

(10) Patent No.: US 7,159,209 B1
(45) Date of Patent: Jan. 2, 2007

(54) INTER-APPLICATION VALIDATION TOOL FOR USE IN ENTERPRISE ARCHITECTURE MODELING

(75) Inventors: Lavanya Srinivasan, Overland Park, KS (US); Nalledath Palat Vinodkrishnan, Overland Park, KS (US); Thomas C. Gifford, Kansas City, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 697 days.

(21) Appl. No.: 10/285,938

(22) Filed: Nov. 2, 2002

Related U.S. Application Data

(60) Provisional application No. 60/404,824, filed on Aug. 19, 2002.

(51) Int. Cl.
*G06F 9/44* (2006.01)

(52) U.S. Cl. .................. 717/126; 717/171; 707/100

(58) Field of Classification Search ............... 717/126, 717/171, 124, 127, 133; 709/223; 707/100; 712/28; 719/315; 370/338
See application file for complete search history.

(56) References Cited

U.S. PATENT DOCUMENTS

| | | | | |
|---|---|---|---|---|
| 5,941,978 A | * | 8/1999 | Finni ........................... | 712/28 |
| 6,138,121 A | * | 10/2000 | Costa et al. ................ | 707/100 |
| 6,427,230 B1 | * | 7/2002 | Goiffon et al. ............. | 717/108 |
| 6,701,514 B1 | * | 3/2004 | Haswell et al. ............. | 717/115 |
| 6,721,807 B1 | * | 4/2004 | Vlissides .................... | 719/315 |
| 6,742,015 B1 | * | 5/2004 | Bowman-Amuah ......... | 718/101 |
| 6,874,146 B1 | * | 3/2005 | Iyengar ....................... | 719/313 |
| 6,907,546 B1 | * | 6/2005 | Haswell et al. ............... | 714/38 |

OTHER PUBLICATIONS

Unified Modeling Language UML Booch & OMt, Quick Reference for Rational Rose 4.0, 1996.*
SNAP Foundation Template Using the SNAP Permanent Storage Component, Template Software, 1998, Chapters 1-4.*
SNAP Foundation Template Using the SNAP Development Environment, Template Software, 1998, Chapters 1-7.*
Nalledath P. Vinodkrishnan, et al., *Modeling Standards Validation Tool for use in Enterprise Architecture Modeling*, filed Dec. 26, 2002, U.S. Appl. No. 10/329,436, Specification (51 pgs.) and Drawings (16 sheets).
Nalledath P. Vinodkrishnan, et al., *Analysis Data Validation Tool for use in Enterprise Architecture Modeling*, filed Nov. 1, 2002, U.S. Appl. No. 10/286,526, Specification (46 pgs.) and Drawings (9 sheets).
Nalledath P. Vinodkrishnan, et al., *Design Data Validation Tool for Use in Enterprise Architecture Modeling*, filed May 8, 2003, U.S. Appl. No. 10/431,773, Specification (37 pgs.) and Drawings (7 sheets).
Lavanya Srinivasan, et al., *Data Validation Tool for Enterprise Architecture*, filed Aug. 7, 2003, U.S. Appl. No. 10/636,121, Specification (43 pgs.) and Drawings 16 sheets).
Lavanya Srinivasan, et al., *Test Integration Tool*, filed Oct. 15, 2003, U.S. Appl. No. 10/686,422, Specification (25 pgs.) and Drawings (11 sheets).

* cited by examiner

*Primary Examiner*—Todd Ingberg

(57) ABSTRACT

A device for modeling an integrated enterprise includes a first tool for constructing a model of the integrated enterprise and a second tool for analyzing inter-application call sets contained in the constructed model. The second tool analyzes a selected inter-application call set by constructing a data attribute matrix having a row for each data attribute contained in at least one of the inter-application calls and a column for each one of the inter-application calls. The data attribute matrix is then marked to indicate which ones of the data attributes are contained in which ones of the selected inter-application calls. The constructed data attribute matrix may then be analyzed to identify improper association of data attributes with calls.

18 Claims, 6 Drawing Sheets

FIG. 5

| App.-Mssg.<br>ATTRIBUTE | B-SUBMIT<br>CancelOrder | E-CANCEL<br>Admin ID | C-CREATE<br>CancelOrder | C-NOTIFY<br>NewOrder | B-Ack<br>ORDER | A-IDENTIFY<br>OE ERROR |
|---|---|---|---|---|---|---|
| SOURCE SYSTEM ORDER ID | X | | | X | X | X |
| REQUEST TYPE | 122 | X | | | | |
| CUSTOMER NUMBER | | X | | | | |
| IP ADDRESS | | X | | | | |
| ADMIN ID | | X | | | | |
| PRIVATE SERVER NAME | | X | | | | |
| CANCEL DISCONNECT STATUS CODE | | | X | | | |
| CANCEL DISCONNECT SEND TIME | | | X | | | |
| CANCEL DISCONNECT SYSTEM ID | | | X | | | |
| CANCEL DISCONNECT FEED ID | | | X | | | |
| CANCEL DISCONNECT RECEIVE TIME | | | X | | | |
| CANCEL DISCONNECT FEED SYSTEM ID | | | X | | | |
| CANCEL DISCONNECT LEAD CIRCUIT ID | | | X | | | |
| CANCEL DISCONNECT LEAD CKT QUANTITY | | | X | | | |
| CANCEL DISCONNECT ALL FLAG | | | X | | | |
| CANCEL DISCONNECT REASON CODE | | | X | | | |
| ⋮ | ⋮ | ⋮ | ⋮ | ⋮ | ⋮ | ⋮ |
| INFRANET ADMIN ID | | | X | | | |
| INFRANET PASSWORD | | | X | | | |
| ERROR DESCRIPTION | 124 | | | | | X |
| STATUS CODE | | | | | | X |

INTER-APPLICATION VALIDATION TOOL FOR USE IN ENTERPRISE ARCHITECTURE MODELING

CROSS-REFERENCE TO RELATED APPLICATION

This application is related to U.S. Provisional Application Ser. No. 60/404,824, filed Aug. 19, 2002 and entitled "Enterprise Architecture Development Process."

This application is also related to U.S. patent application Ser. No. 10/285,884 entitled "Data Integration Techniques For Use In Enterprise Architecture Modeling" and U.S. patent application Ser. No. 10/286,526 entitled "An Analysis Data Validation Tool For Use In Enterprise Architecture Modeling," both of which were filed on even date herewith, assigned to the Assignee of the present application and hereby incorporated by reference as if reproduced in their entirety.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The invention is directed to an inter-application validation tool suitable for use in enterprise architecture modeling. By analyzing application-to-application calls for a model of an enterprise on an attribute-by-attribute basis, the inter-application validation tool may be used to identify errors, particularly those located within data rich application-to-application operations, within the model.

BACKGROUND OF THE INVENTION

The rapid evolution of computer and communication technologies coupled with the robust economies of the 1980s and 1990s resulted in unprecedented growth in the information technology ("IT") field. During this period, the need to establish a competitive advantage drove companies to faster and faster rates of change to support new product offerings and expanded services. As a result of these market pressures and time constraints, most companies elected to support new products and services by adding additional back office systems. However, due to the lack of mature integration technologies, the new systems were connected to the existing IT systems by making direct connections to the software routines already in use. The vulnerability of this design is that a change in one system produces a "ripple effect" change in every system it connects with. Over time, this incremental stacking of software systems can result in an integration ceiling. That is, at a certain point, more effort is spent on the connections than on new functionality and further expansion becomes cost prohibitive.

In the late 1990s, new integration technologies emerged that made it possible to "loosely couple" applications so that systems are no longer directly connected. Thus, changes in one system would not cause a ripple effect in any other systems. The most notable of these technologies are Message Oriented Middleware ("MOM"), Publish and Subscribe messaging, and Object Request Brokers ("ORBs"). These technologies enabled companies to re-architect their conglomeration of systems into an architecture that allows them to expand in a cost-effective manner. Technologies such as these that address the problem of integrating existing systems with new systems in an organized, efficient, and economically scaleable manner can be referred to collectively as enterprise application integration ("EAI") technologies.

An integrated enterprise may have any number of applications which interact with other applications of the enterprise. Among other things, the interface control documents ("ICDs") for an integrated enterprise describes all of the inter-application interactions taking place within the integrated enterprise. An interaction between first and second applications of an integrated enterprise is typically in the form of a "call" comprised of a first (or "message") portion and a second (or "attribute") portion. The message portion of the call describes the inter-application operation to be conducted while the attribute portion of the call is comprised of one or more data attributes, each of which describes a discrete characteristic of the data involved in the inter-application operation. A common problem in inter-application operations occurs when a system designer associates an incorrect set of data attributes with a message. For example, many messages require that an acknowledgement or other type of response be issued by the application receiving the message. Oftentimes, the original command message and the subsequent response message share a common set of data attributes. An error would occur, then, if the command and response messages are associated with different sets of data attributes.

Errors such as these can only be identified through a detailed manual examination of the ICDs for an integrated enterprise. Such a task can be quite difficult, however, particularly when a "data-rich" messaging environment is involved. In a "data-rich" messaging environment, plural data attributes are associated with a single message. For example, if fifty data attributes are associated with plural messages, for example, a first (or "send") message and a second (or "return") message, it should readily be appreciated that the task of examining the ICD documents (or other documentation) which describe an enterprise in order to determine that both the send and return messages include all fifty data attributes in their proper format would be both difficult and time consuming. It should be further appreciated that a tool capable of producing a matrix of data attributes and messages associated with each such data attribute would greatly assist a system designer in search of correcting such errors in the ICD documents which describe an enterprise. It is, therefore, the object of this invention to provide such a tool.

SUMMARY OF THE INVENTION

In one embodiment, the present invention is directed to a device for modeling an integrated enterprise having first and second applications. The modeling device includes a unified modeling language ("UML") tool for constructing a model of the integrated enterprise and a tool for analyzing call sets contained in the model of the integrated enterprise. In one aspect thereof, the tool further includes means for analyzing call sets comprised of at least two calls between a first application and a second application. In another aspect of this embodiment of the invention, the tool relates data attributes associated with one of the two calls of a call set to all of the calls of that call set and, in a still further aspect thereof, the tool may also include means for displaying a graphical display of the relationship between data attributes associated with one of the two calls of the call set to all of the calls of the call set.

In still another aspect thereof, the UML modeling and call set analysis tools may reside together within a computer system and, in still yet another, the UML tool may be used to generate an interface control document ("ICD") for the integrated enterprise. When ICD documents are generated by the UML tool, the call set analysis tool would be used to analyze calls between the first and second applications which are contained in the ICD document. Variously, the ICD document may be either an analysis ICD document or a design ICD document.

In another embodiment, the present invention is directed to a tool for analyzing inter-application calls between applications of an integrated enterprise which includes means for selecting at least two inter-application calls to be analyzed and means for generating a data attribute matrix for the selected inter-application calls. When generating the data attribute matrix, a row is assigned to each data attribute contained in at least one of the selected inter-application calls and a column is assigned to each one of the selected inter-application calls. In one aspect, the tool further includes means for marking the data attribute matrix to indicate which ones of the data attributes are contained in which ones of the selected inter-application calls. In another, the tool includes means for generating a graphical display of the marked data attribute matrix. In still another, the tool is encoded in software which resides within a computer system.

In still another embodiment, the present invention is directed to a method of analyzing inter-application calls. In accordance with the method, at least two inter-application calls are first selected. At least one data attribute contained in at least one of the selected inter-application calls is then identified. An association between the selected inter-application call and the data attributes identified as being contained in that call is then established for each one of the selected inter-application calls. Associations to data attributes established for a first one of the selected inter-application calls is then compared to associations to data attributes established for a second one of the selected inter-application calls and errors in the first and second selected inter-application calls are subsequently identified from a comparison of associations to data attributes established for the first selected inter-application call to associations to data attributes established for the second selected inter-application call.

In one aspect thereof, an association between the selected inter-application call and the data attributes identified as being contained in that call is established by first establishing an association between the data attribute and all of the calls in which the data attribute is contained. In this aspect, the desired association between the selected inter-application call and the data attributes identified as being contained in that call is produced by the association of each one of the identified data attributes and all of the selected inter-application calls in which the data attribute is contained. In another aspect, the association of the data attribute and all of the selected inter-application calls in which the data attribute is contained is produced by generating a matrix having a plurality of rows and a plurality of columns. Each one of the rows is assigned to one of the data attributes identified as being contained in at least one of the selected inter-application calls while each one of the columns is assigned to one of the selected inter-application calls. The data attribute matrix is then marked each time one of the plurality of rows intersects one of the plurality of columns assigned to an inter-application call previously identified as containing the data attribute to which the row was assigned.

In another aspect thereof, the identified errors in the first and second ones of the selected inter-application calls are corrected. In another, the identified errors in the first and second ones of the selected inter-application calls are corrected by modifying the first and second inter-application calls such that the first set of data attributes contained in the first inter-application call matches the second set of data attributes contained in the second inter-application call. Variously, modification of the first and second inter-application calls may be performed by adding at least one data attribute to the first inter-application call, adding at least one data attribute to the second inter-application call, removing at least one data attribute from the first inter-application call or removing at least one data attribute from the second inter-application call.

DESCRIPTION OF DRAWINGS

FIG. 5 is a data attributes matrix generated by applying the method of FIG. 3 to that portion of the ICD document illustrated in FIG. 4.

DETAILED DESCRIPTION OF THE INVENTION

Figure 1:
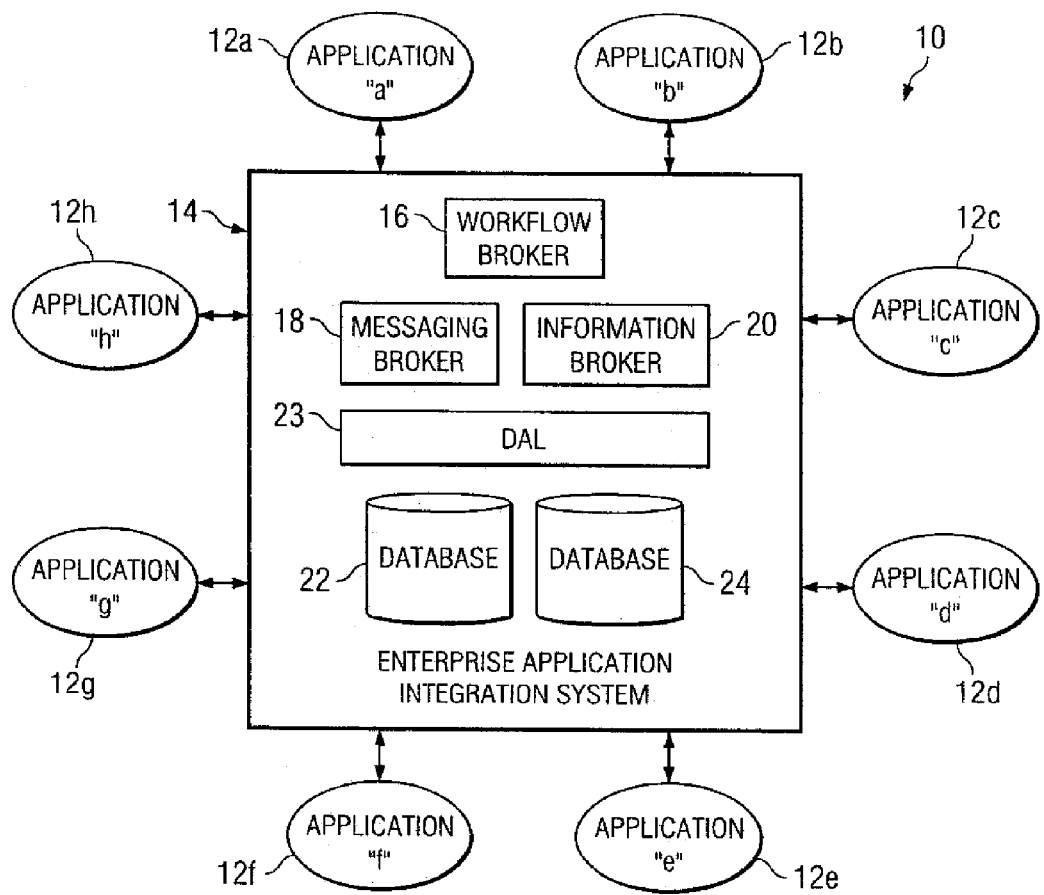
FIG. 1 is a block diagram of an integrated enterprise.

Referring first to FIG. 1, an integrated enterprise 10 will now be described in greater detail. As may now be seen, plural applications have been integrated into the integrated enterprise 10 by an EAI system 14. In the embodiment of the invention disclosed herein, a first application 12a, a second application 12b, a third application 12c, a fourth application 12d, a fifth application 12e, a sixth application 12f, a seventh application 12g and an eighth application 12h have all been integrated into the integrated enterprise 10. It should be clearly understood, however, that any number of applications may be integrated into the integrated enterprise 10. Once integrated into the integrated enterprise 10, the applications 12a through 12f may exchange messages with any of the other applications integrated into the integrated enterprise 10 or access any of the databases shared by the integrated enterprise 10. As illustrated in FIG. 1, a first database 22 and a second database 24 are shared by the integrated enterprise 10. Of course, it is fully contemplated that any number of databases ("DBs") may be shared by the enterprise 10. Furthermore, while FIG. 1 shows the enterprise 10 as being comprised of plural applications and plural databases integrated together by the EAI system 14, it is fully contemplated that a wide variety of other types of devices may be integrated into, and form part of, the integrated enterprise 10.

The EAI system 14 includes plural components which collectively enable integration of the integrated enterprise 10 so that the aforementioned inter-application exchange of messages and/or access of shared databases may be conducted. The components of the EAI system 14 which enable such exchanges and/or accesses include a workflow broker 16, a messaging broker 18 and an information broker 20. While a complete description of the operation of the workflow broker 16, the messaging broker 18 and the information broker 20 is beyond the scope of this application, briefly, using a set of pervasive services (not shown), the workflow broker 16, the messaging broker 18 and the information broker 20 implement specific business logic to integrate the enterprise 10. More specifically, the messaging broker 16 enables system integration at either the application level (the applications 12a through 12f) or the database level (the shared databases 22 and 24). Once an event is defined, or "published", in a source system, other systems interested in that event can "subscribe" to the published event. The message broker 16 then attends to delivery of event messages to subscribing systems.

The workflow broker 16 is responsible for process integration and enables business automation capabilities. To initiate work, an application, for example, the application 12a, interfaces with the workflow broker 16 through the message broker 18. Finally, the information broker 20 abstracts systems from the shared databases 22 and 24. On one end, the information broker 20 attaches itself to a logical data structure, specifically, data access layer ("DAL") 23, within the shared databases 22 and 24 and, on the other end, exposes interfaces to systems that require data to be persisted to disparate databases. In this manner, the information broker provides an efficient mechanism for applications, for example, the applications 12a through 12f, to access the shared databases 22 and 24. Of course, it should be clearly understood that the foregoing description of the workflow broker 16, the messaging broker 18 and the information broker 20 has been greatly simplified for ease of understanding. It should be further understood that, as described and illustrated herein, the EAI system 14 has been greatly simplified in that other components of the EAI system 14 which, like the workflow broker 16, the messaging broker 18 and the information broker 20, contribute to the integration of the enterprise 10 have been omitted from the drawing for ease of description.

Figure 2:
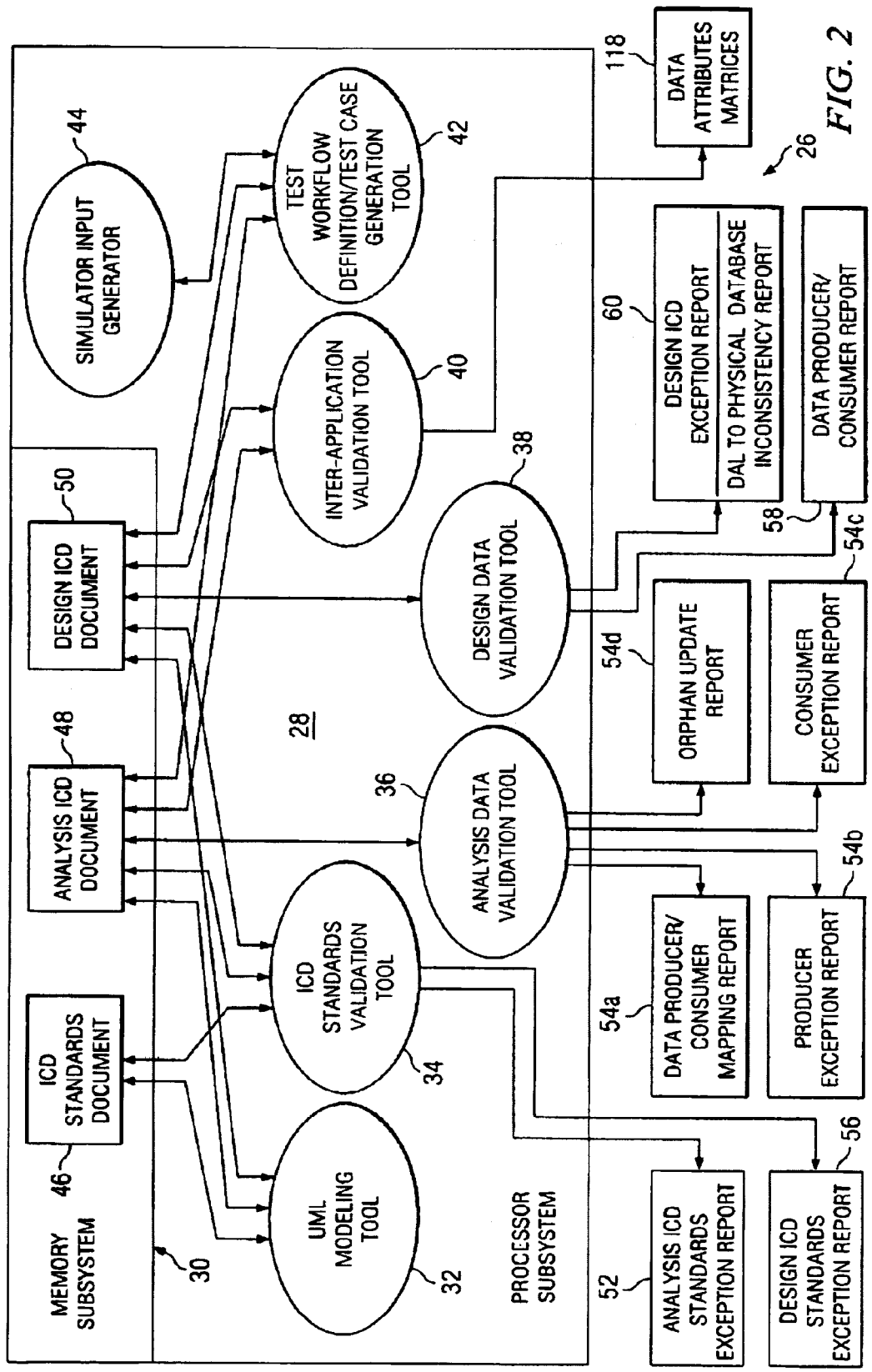
FIG. 2 is a device for constructing a model of the integrated enterprise of FIG. 1.

Referring next to FIG. 2, a device 26 for constructing a model of the integrated enterprise 10 of FIG. 1 will now be described in greater detail. The integrated enterprise modeling device 26, which typically resides within a computer system, for example, a personal computer ("PC") having a processor subsystem 28 and a memory subsystem 30 coupled to one another, is comprised of first, second, third, fourth, fifth, sixth and seventh tools 32, 34, 36, 38, 40, 42 and 44. Each one of the tools 32 through 44 is a software application comprised of a series of instructions encoded in the memory subsystem 30 of the integrated enterprise modeling device 26 as computer readable program code and executable by the processor subsystem 28 of the integrated enterprise modeling device 26. As used herein, the term "processor subsystem" refers to the collective processing capacity of the computer system in which the integrated enterprise modeling device 26 resides. Similarly, the term "memory subsystem" refers to the collective memory capacity of the computer system in which the integrated enterprise modeling device 26 resides. While it is contemplated that, in one embodiment of the invention, the computer system may be exclusively dedicated to the functionality which embodies the integrated enterprise modeling device 26, more typically, the computer system will be configured to provide additional functionality and will include a platform, for example, the Windows NT platform manufactured by Microsoft Corporation of Redmond, Wash., from which the integrated enterprise modeling device 26 is launched. As will be more fully described below, after launching the integrated enterprise modeling device 26 from the Windows NT platform, a computer user models the integrated enterprise 10 by constructing a series of documents, which includes one or more of first, second and third documents 46, 48 and 50, using the tools 32 through 44. The documents created by the computer user and subsequently stored in the memory subsystem 30 collectively describe the integrated enterprise 10. Of course, it should be clearly understood that, as described and illustrated herein, the integrated enterprise modeling device 26 has been greatly simplified and that various documents constructed during the modeling process and/or the tools used to construct those documents have been omitted for ease of description.

The first (or "ICD standards") document 46 documents the guidelines with which the second (or "analysis ICD") document 48 and the third (or "design ICD") document 50 are to be subsequently constructed. The ICD standards document 46 is constructed using a word processing application (not shown), for example, Microsoft Word. The analysis ICD document 48 and the design ICD document 50, on the other hand, both identify the sequence of events exchanged between applications, the interfaces between applications and brokers and the interfaces between applications. Typically, the design ICD document 50 differs from the analysis ICD document 48 in that the design ICD document 50 also captures database mapping between the data access layer 23 and the physical layer of the shared databases 22 and 24 for the integrated enterprise 10. The analysis ICD document 48 and the design ICD document 50 are both constructed using the first (or "UML modeling") tool 32. The UML modeling tool 32 used to construct the analysis ICD document 48 and the design ICD document 50 may be any one of a number of commercially available software applications. For example, the "Rational Rose" software application manufactured by Rational Software Corporation of Cupertino, Calif. and Lexington, Mass. would be suitable for constructing the analysis ICD document 48 and the design ICD document 50.

After the ICD standards document 46 is constructed using Microsoft Word or another word processing application, the UML modeling tool 32 applies the analysis ICD standards contained in the ICD standards document 46 to information, typically in the form of plural documents (not shown) describing the system requirements of the integrated enterprise 10 to be modeled to construct the analysis ICD document 48. After the analysis ICD document 48 is constructed, the ICD standards validation tool 34 checks the analysis ICD document 48 to determine that the analysis ICD document 48 complies with the analysis ICD standards set forth in the ICD standards document 46. After completing an analysis of the analysis ICD document 48, the ICD standards validation tool 34 generates an analysis ICD standards exceptions report 52 which, in turn, may be used as a guide in a subsequent modification of the analysis ICD document 48 (if needed) to place the analysis ICD document 48 into compliance with the analysis ICD standards set forth in the ICD standards document 46.

After the analysis ICD document 48 has been brought into compliance with the analysis ICD standards set forth in the ICD standards document 46, construction of an interim analysis model of the integrated enterprise is complete and construction of an integrated analysis model of the integrated enterprise 10 commences. To do so, the analysis data validation tool 36 analyzes the analysis ICD document 48 to validate the various accesses of the shared databases 22 and 24 by the applications 12*a* through 12*f* of the integrated enterprise 10 which are described in the analysis ICD document 48. After completing an examination of the analysis ICD document 48, the analysis data validation tool 36 generates, for data attributes that are store in and/or retrieved from the shared databases 22 and 24 by the applications 12*a* through 12*f*, a producer/consumer mapping report 54*a*, a producer exception report 54*b*, a consumer exception report 54*c* and an orphan update report 54*d* which identifies data attributes updated but never created. By identifying, in the analysis data producer/consumer reports 54*a* through 54*d*, (1) a map of producers and consumers of data attributes; (2) a first exception report identifying data attributes which one or more of the applications 12*a* through 12*f* seeks to consume but none of the applications 12*a* through 12*f* ever produced; and (3) a second exception report identifying data attributes produced by one or more of the applications 12*a* through 12*f* but never consumed by any of the applications 12*a* through 12*f*, the analysis data producer/consumer reports 54*a* through 54*d* may be used as a guide during a subsequent modification of the analysis ICD document 48, again using the UML modeling tool 32, to correct any errors contained in the analysis ICD document 48, thereby constructing an integrated analysis model of the integrated enterprise 10. Furthermore, it should be noted that, by modifying the analysis ICD document 48 based upon the information contained in the analysis data producer/consumer reports 54*a* through 54*d*, modeling errors contained in the analysis ICD document 48 may be identified and corrected relatively early in the process of constructing a model of the integrated enterprise 10. Finally, once the results of an application of the analysis data validation tool 36 against the analysis ICD document 48 indicates a correspondence between producers and consumers of data attributes, the analysis ICD document 48 may be deemed as having been validated for any further usages thereof.

Once the analysis ICD document 48 has been validated, the UML modeling tool 32 is then used to construct the design ICD document 50, this time by applying the design ICD standards contained in the ICD standards document 46 to information, typically comprised of the analysis ICD document 48 and additional documents describing the physical layer of the shared databases 22 and 24 to construct the design ICD document 50. After the design ICD document 50 is constructed, the ICD standards validation tool 34 checks the document to determine whether the design ICD document 50 complies with the design ICD standards set forth in the ICD standards document 46. After completing an analysis of the design ICD document 50, the ICD standards validation tool 34 generates a design ICD standards exceptions report 56 which, in turn, may be used as a guide in a subsequent modification of the design ICD document 50 into compliance with the design ICD standards set forth in the ICD standards document 46.

In accordance with the embodiment of the invention set forth herein, the ICD standards document 46 contains both the analysis ICD standards and the design ICD standards for the integrated enterprise 10. In further accordance with the disclosed embodiment, a single tool, specifically, the ICD standards validation tool 34, applies the analysis ICD standards and the design ICD standards contained in the ICD standards document 46 to the analysis ICD document 48 and the design ICD document, respectively, to produce the analysis ICD standards exception report 52 and the design analysis ICD standards exception report 56. It should be clearly understood, however, that, in alternate embodiments of the invention, the analysis ICD standards and the design ICD standards may be maintained in separate documents and, in further alternate embodiments of the invention, discrete tools, specifically, an analysis ICD standards validation tool and a design ICD standards validation tool, may be used to examine the analysis ICD document 48 and the design ICD document 50, respectively. Finally, in still another embodiment of the invention, the functionality residing in the ICD standards validation tool 34 may be placed within the analysis data validation tool 36 and the design data validation tool 38. In such an embodiment, the analysis data validation tool 36 would generate the analysis ICD standards exception report 52 while the design data validation tool 38 would generate the design ICD standards exception report 56, for example, at the same general time that the analysis data validation tool 36 and design data validation tool 38 generate analysis data producer/consumer reports 54*a* through 54*d* and design data producer/consumer reports 58, respectively.

After the design ICD document 50 has been brought into compliance with the design ICD standards set forth in the ICD standards document 46, construction of an interim design model of the integrated enterprise is complete and construction of an integrated design model of the integrated enterprise commences. To do so, the design data validation tool 38 analyzes the design ICD document 48 to validate the various accesses to the physical layer of the shared databases 22 and 24 by the applications 12*a* through 12*f* of the integrated enterprise 10 set forth therein. After completing an analysis of the design ICD document 50, the design data validation tool 38 generates design data producer/consumer reports 58 for physical data attributes that are stored in and/or retrieved from the shared databases 22 and 24 by the applications 12*a* through 12*f*. It should be clearly understood that the design data producer consumer reports 58 include a design data producer/consumer mapping report, a producer exception report, a consumer exception report and an orphan update report and appear in the drawings as a single element purely for ease of illustration. The design data validation tool 38 will also generate a design ICD exception report 60*a* and a data access layer-to physical database inconsistency report 60*b* to identify inconsistencies, within the design ICD document 50, in mapping attributes of the information broker 20 to the physical layer of the shared databases 22 and 24. By identifying, in the various design data producer/consumer reports 58, the design ICD exception report 60*a* and the data access layer-to-physical database inconsistency report 60*b*: (1) a map of producers and consumers of physical data attributes; (2) a first exception report identifying data attributes which one or more of the applications 12*a* through 12*f* seeks to consume but none of the applications 12*a* through 12*f* ever produced; (3) a second exception report identifying data attributes produced by one or more of the applications 12*a* through 12*f* but never consumed by any of the applications 12*a* through 12*f*; and (4) inconsistencies in mapping data attributes from the data access layer to the physical layer of the shared databases 22 and 24, the various design data producer/consumer reports 58, the design ICD exception report 60*a* and/or the data access layer-to-physical database inconsistency report 60*b* may be used as a guide during a subsequent modification of the design data ICD document 48. As before, by modifying the design ICD document 48 based upon the information contained in the data producer/consumer reports 58, the design ICD exception report 60*a* and/or the data access layer-to-physical database inconsistency report 60*b*, modeling errors contained in the design ICD document 50 may be identified and corrected relatively early in the process of constructing a model of the integrated enterprise 10. Finally, once the results of an application of the design data validation tool 38 against the design ICD document 50 indicates a correspondence between producers and consumers of data attributes and the absence of any data access layer-to-physical database inconsistencies, the design ICD document 50 may be deemed as having been validated for any further usages thereof.

While the analysis data validation tool 36 and the design data validation tool 38 are used to identify errors in application-to-database calls within the model of the integrated enterprise 10, as will be more fully described with respect to FIGS. 3–5, below, the inter-application validation tool 40 is used to identify errors in application-to-application calls within the model of the integrated enterprise 10 by analyzing the application-to-application calls within the model of the integrated enterprise 10 on an attribute-by-attribute basis. While suitable for identifying errors in any application-to-application call, the benefits of using the inter-application validation tool 40 are more readily apparent when the inter-application validation tool is used to identify errors in data rich application-to-application calls in which a single call may easily have fifty or more data attributes associated therewith. In particular, the inter-application validation tool 40 is particularly useful in identifying errors in "pass-through" messages that should be received by an application and sent on by that application in the same format.

As disclosed herein, the inter-application validation tool 40 is suitable for use with either the analysis ICD document 48 and/or the design ICD document 50 which model the integrated enterprise 10. Typically, the inter-application validation tool 40 would be used to examine the analysis ICD document 48 subsequent to the examination thereof by the analysis data validation tool 36 and prior to construction of the design ICD document 50. Similarly, the inter-application validation tool 40 would be used to examine the design ICD document 50 subsequent to examination thereof by the design data validation tool 38. While disclosed herein in connection with the validation of application-to-application calls within an enterprise computing environment, it should be clearly understood that the inter-application validation tool 40 is equally suitable for use in validating application-to-application calls within other computing environments.

The test workflow definition/test case generation tool 42 defines all of the integration scenarios that need to be tested during end-to-end testing and generates integration test cases for the integration scenarios from the analysis and design ICD documents 48 and 50. Finally, the simulator input generator 44, which uses the test workflow definition/test case generator tool 42, is an automated testing tool that allows simulation of external systems for interfaces testing. The simulator input generator 44 also generates the interface information required for simulating the interfaces.

Figure 3A:
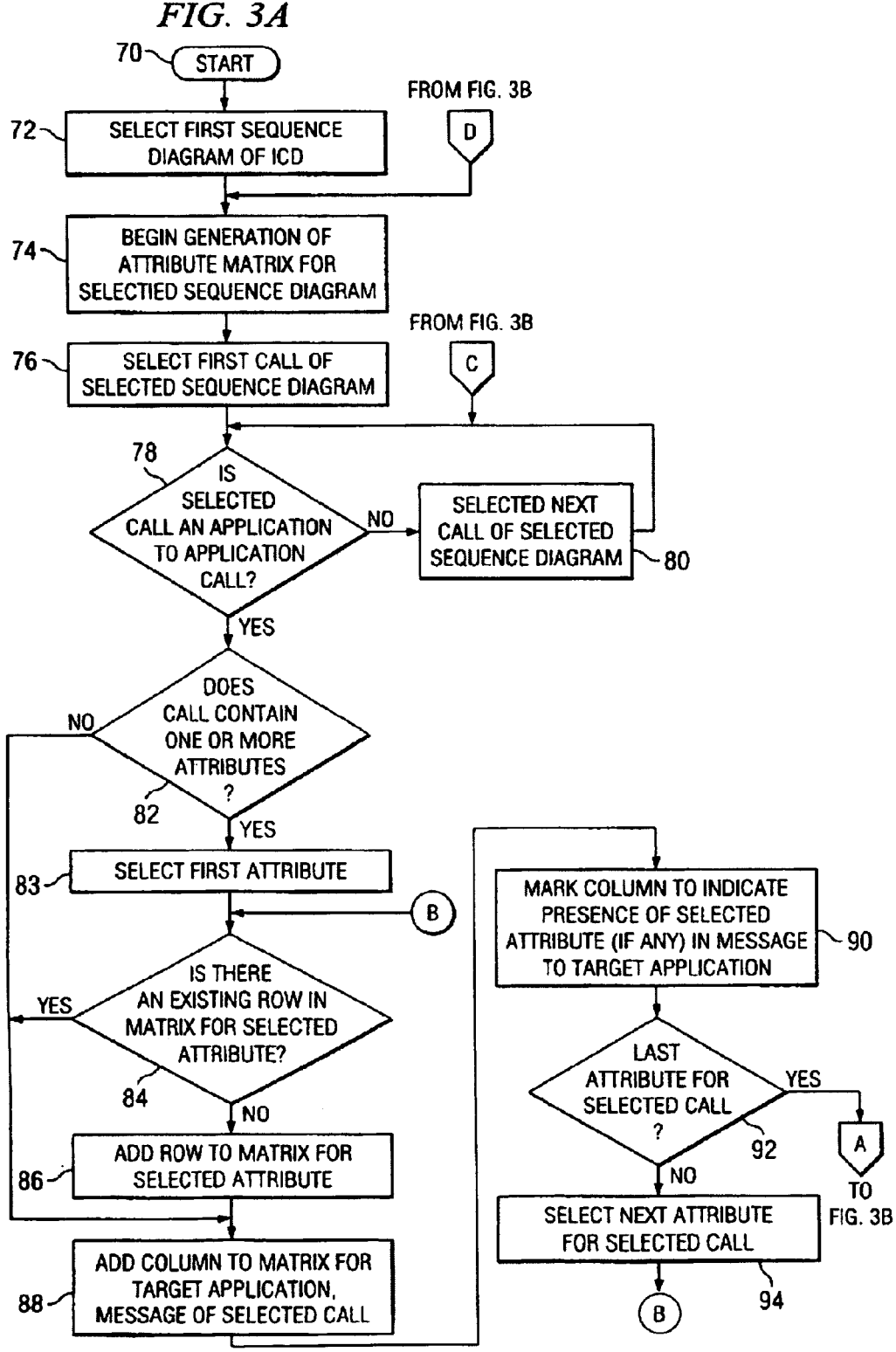
FIG. 3 is a flowchart of a method for analyzing inter-application interactions for the integrated enterprise of FIG. 1 using an inter-application validation tool forming part of the modeling device of FIG. 2.
Figure 3B:
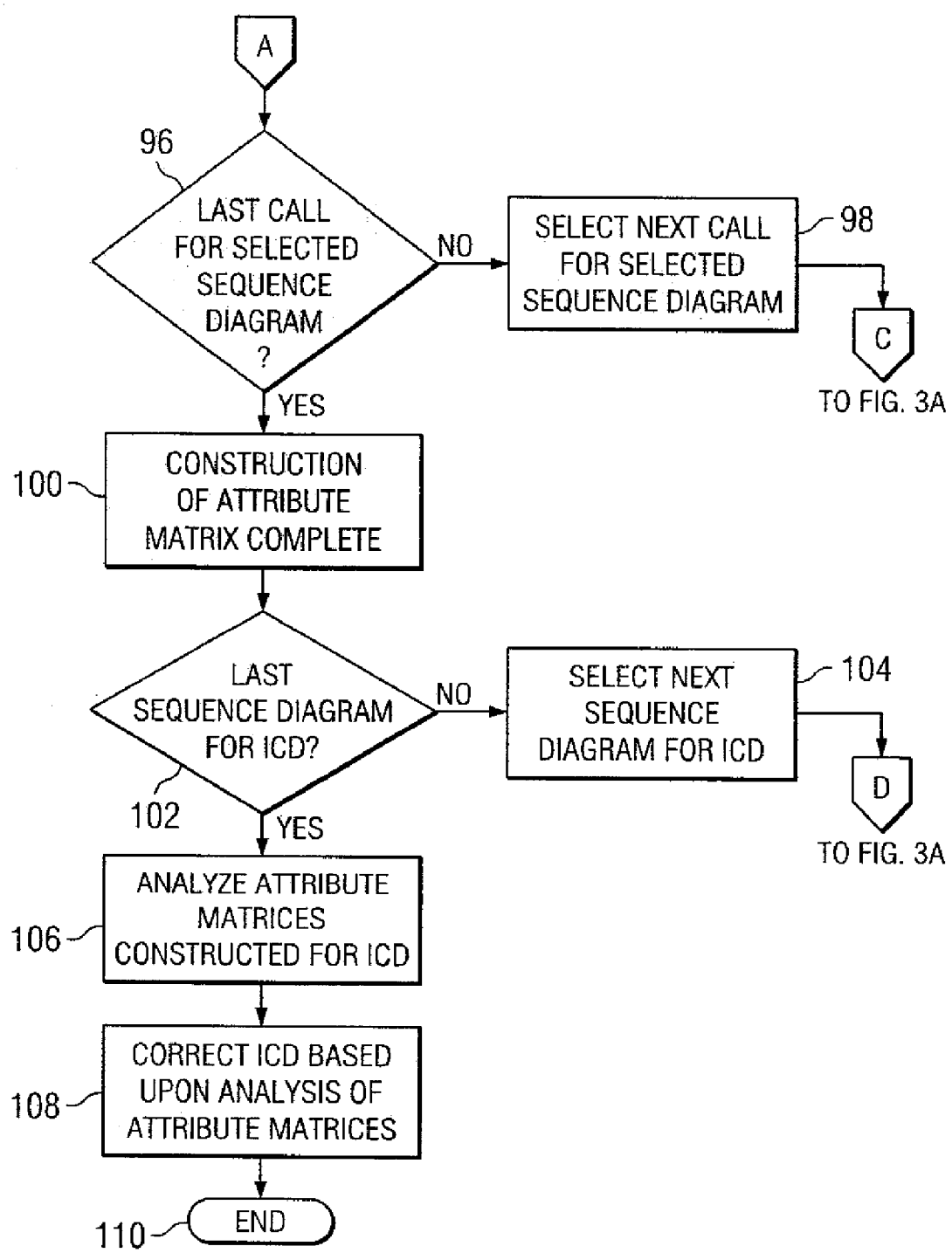
Figure 4:
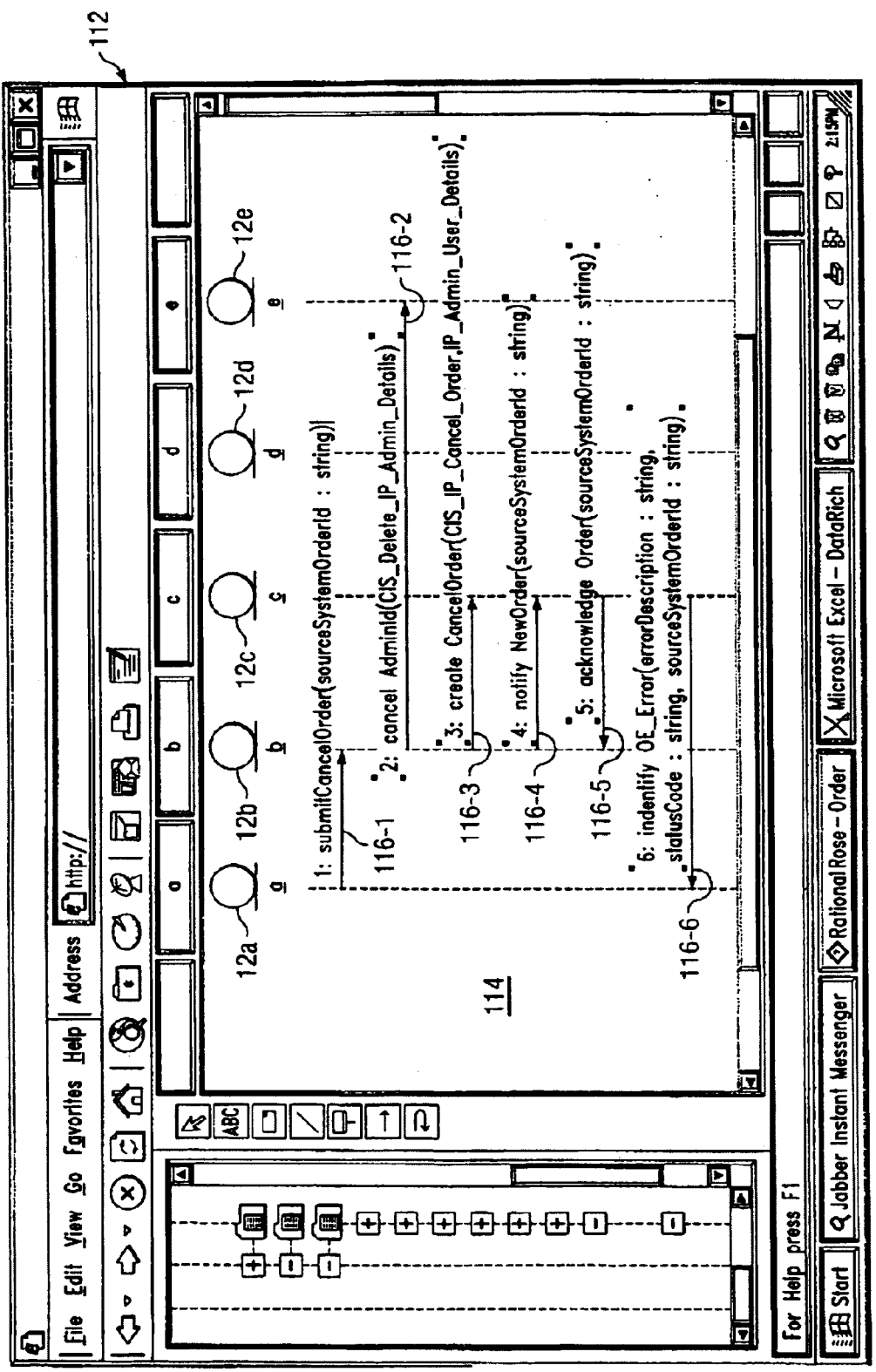
FIG. 4 illustrates a portion of an ICD document which models the integrated enterprise of FIG. 1.

Referring next to FIG. 3, a method for analyzing inter-application interactions for a model of an enterprise, for example, the enterprise 10, using the inter-application validation tool 40 will now be described in greater detail. Prior to describing this method, however, a brief description of an ICD document, for example, the analysis ICD document 48 or the design ICD document 50, and a data attribute matrix produced, by the inter-application validation tool 40, upon examination of the ICD document, will greatly facilitate an understanding of the present invention. FIG. 4 illustrates a portion of an exemplary ICD document 112 which may be stored in the memory subsystem 30 of the integrated enterprise modeling device 26 as it is graphically displayed to the user by the UML modeling tool 32. The ICD document 112 is comprised of plural sequence diagrams, of which only a first sequence diagram 114 may be seen in FIG. 4. Each sequence diagram, for example, the sequence diagram 114, describes a task to be performed by the enterprise modeled by the ICD document 112. To describe a task, the sequence diagram 114 identifies the applications, databases and/or other components of the enterprise involved in performing the task. For example, for the task described by the sequence diagram 114, the first, second, third, fourth and fifth applications 12a, 12b, 12c, 12d and 12e are involved in performing the task. Each component involved in the task is represented, in the sequence diagram 114, by an iconic representation. For example, in FIG. 4a, the application 12a is iconically represented by a circle. In proximity to the iconic representation of each application or other type of component involved in the task described by the sequence diagram 114 is the name of the application or other type of component. For example, in FIG. 4, the name of the application 12a is identified by character string "a" located immediately below the aforementioned iconic representation thereof.

Beneath the iconic representations/names of the components of the enterprise involved in the task described by the sequence diagram 114, a series of calls 116-1, 116-2, 116-3, 116-4, 116-5 and 116-6 are listed in a descending order which corresponds to the order of execution when the task described by the sequence diagram 114 is performed. Each call has a source application and a target application. In the sequence diagram 114, each call forming part of the task is iconically represented by an arrow with the source application for the call generally aligned with the tail of the arrow and the target application for the call generally aligned with the head of the arrow. For example, the source application for the call 116-1 is the application 12a while the target application for the call 116-1 is the application 12b. Positioned above each iconic representation of a call in the sequence diagram 114 is a description of the call. The description of each call consists of a message and one or more data attributes. For example, the call 116-1 is comprised of the message "submitCancelOrder" and the data attribute "sourceSystemsOrderID." Of course, the particular iconic representations used in the sequence diagram 114 are purely exemplary and it is fully contemplated that a wide variety of other iconic representations may be used in their stead.

Turning momentarily to FIG. 5, a data attributes matrix 118 generated by applying the method of FIG. 3 to that portion of an ICD illustrated in FIG. 4 may now be seen, again as it is graphically displayed to the user by the inter-application validation tool 40. The data attributes matrix 118 is an "n by m" matrix in which "n" is the total number of calls contained in the sequence diagram 114 and "m" is the total number of discrete data attributes contained in the sequence diagram 114. For each call contained in the data attributes matrix 118, the data attributes matrix 118 identifies both the message contained in the call and the target application for the call. As will be more fully described below, the data attributes matrix 118 is configured such that a row is assigned to each discrete data attribute contained in the sequence diagram 114, a column is assigned to each call contained in the sequence diagram 114 and the column corresponding to a call is marked at each row for which the data attribute corresponding to that row is contained within the call.

For example, in FIG. 5, being the sixth column in the data attributes matrix 118, column 120 corresponds to the sixth call 116-6 of the sequence diagram 114. The column 120 is titled "A-Identify OE Error" because, as shown on the sequence diagram 114, the target application of the call 116-6 is the application 12a and the message contained in the call 116-6 is "identifyOE_Error." As further indicated on the sequence diagram 114, the call 116-6 includes the data attributes "errorDescription", "statusCode" and "sourceSystemOrderId." To indicate which data attributes are associated with the "IdentifyOE_Error" message issued to the application 12a, the intersection of the rows corresponding to the data attributes "errorDescription", "statusCode" and "sourceSystemOrderId" and the column corresponding to the application 12a should be marked. Accordingly, in the data attributes matrix 118, rows 122, 124 and 126 of the column 120 are marked. It should be noted that, rather than referencing one or more data attributes, the data attributes portion of the calls 116-2 and 116-3 reference details. A detail references a larger set of data attributes listed in a separate location. For example, the detail forming part of the call 116-2 references a group of data attributes comprised of Request Type, Customer Number, IP Address, Admin ID and Private Server Name data attributes. The detail forming part of the call 116-3, on the other hand, references an even larger group of data attributes of which only the Cancel Disconnect Status Code, Cancel Disconnect Send Time, Cancel Disconnect System ID, Cancel Disconnect Feed ID, Cancel Disconnect Receive Time, Cancel Disconnect Feed System ID, Cancel Disconnect Lead Circuit ID, Cancel Disconnect Lead Circuit Quantity, Cancel Disconnect All Flag, Cancel Disconnect Reason Code, Infranet Admin ID and Infranet Password are identified in FIG. 5.

As all of the data attributes for the sequence diagram 114 are listed in a selected order common to all of the calls 116-1 through 116-6 forming the sequence diagram and all of the data attributes associated with each such call are marked, it should be readily appreciated that the data attributes matrix 118 is particularly well suited for comparing two or more specified calls to determine the differences, if any, between the data attribute usage for the specified calls. For example, a command message issued to a target application should have a first set of data attributes associated therewith while a response message generated by the target application should have a second set of data attributes associated therewith. Variously, the first and second sets of data attributes may be entirely identical, share one or more data attributes or be entirely distinct to one another. However, when constructing an ICD document, for example, either an analysis ICD or a data ICD, one or more of the desired data attributes may have been unintentionally omitted from one or both of the command message or response message calls and/or one or more unnecessary data attributes may have been added to one or both of the calls. By examining these calls, as represented in the data attribute matrix 118, such errors may be readily identified. For example, if both of the command and response message calls are supposed to have identical sets of data attributes, comparing the respective columns of the data attribute matrix 118 for these messages will quickly identify any differences between the set of data attributes for these calls.

It should be noted that both the exemplary calls represented in the data attribute matrix 118 as well as the example hereinabove described are relatively simple examples of the use of the data attribute matrix 118. Analyzing many calls would, however, be a much more complicated task. As previously set forth, inter-application calls are often termed data-rich because of the large number of data attributes associated with the calls. It should readily be appreciated that the task of comparing data attribute sets between two calls is much more difficult when the calls are data-rich and, under conditions such as this, the inter-application validation tool 40 would be of great-assistance when performing an analysis of the two message calls. While there is no absolute minimum number of data attributes needed to make a call data-rich, a call having fifty or more data attributes associated therewith would clearly be deemed to be a data-rich call. It should also be readily appreciated that the task of comparing data attribute sets between larger numbers of calls, whether or not such calls are data-rich, would be much more difficult without the use of the inter-application validation tool 40.

Returning now to FIGS. 3-1 and 3-2, a method of analyzing an ICD document modeling an enterprise will now be described in greater detail. Prior to commencing a description of the method set forth herein, it should be noted that the method by which the inter-application validation tool 40 acquires data from the selected sequence diagrams and/or selected calls is described in relation to the graphical representation of the sequence diagram 114 illustrated in FIG. 4. It should be clearly understood that the invention has been described in this manner for clarity purposes. When physically embodied, however, the inter-application validation tool 40 would analyze the selected sequence diagrams and/or selected calls thereof in the form that they are maintained in the memory subsystem 30.

It should also be noted that while, as described herein, an entire ICD document is analyzed, the inter-application validation tool 40 is equally suitable for analyzing a portion of an ICD document. For example, rather than analyzing plural sequence diagrams, the inter-application validation tool 40 may be used to analyze a single sequence diagram of an ICD document. It is further contemplated that, in addition to analyzing all of the calls of a sequence diagram, the inter-application validation tool 40 may instead be used to analyze a selected set of two or more calls. Typically, a selected set of two or more calls would consist of calls forming part of a common sequence diagram. However, it is contemplated that the selected set of calls may be spread over plural sequence diagrams. Furthermore, while the inter-application validation tool 40 is commonly used to analyze sets of two or more calls, it should be clearly understood that the inter-application validation tool 40 may be used to analyze a single call. However, as many of the benefits which derive from the use of the inter-application validation tool 40 for comparative data attribute usages, it is contemplated that use of the inter-application validation tool 40 in connection with the analysis of a single call would be more infrequent. So that the inter application validation tool 40 should include means, for example, a mouse or other user interface, for selecting a set of two or more calls for analysis.

The method commences at step 70 and, at step 72, a first sequence diagram of an ICD document, for example, the sequence diagram 114 of the ICD document 112, to be analyzed is selected. The method then proceeds to step 74 where generation of a data attribute matrix, for example, the data attribute matrix 118, for the selected sequence diagram is commenced. As described herein, the data attribute matrix 118 is gradually constructed with a new column added to the data attribute matrix 118 for each pass during which a call is analyzed. During each such pass, depending on the number of newly identified data attributes, any number of rows would also be added to the data attribute matrix 118. Alternately, however, the selected sequence diagram and/or selected rows thereof may instead be analyzed, the relevant data extracted therefrom and the data matrix subsequently constructed from the extracted data.

Proceeding on to step 76, a first call of the selected sequence diagram is selected. At step 78, the method determines if the selected call is an application-to-application call. As previously set forth, each component included in a sequence diagram is represented by an icon. To determine if the selected call is an application-to-application call, the icon representing the source and target of the call may be checked against the icon representing an application. If either the source or target of the selected call is not an application, for example, if the call is an access to shared database, the method determines that the selected call is not an application-to-application call. The method would proceed to step 80 where a next call of the selected sequence diagram would be selected and then return to step 78 to again determine if the selected call is an application-to-application call.

Returning to step 78, if the inter-application validation tool 40 determines that the selected call is an application to application call, the method proceeds to step 82 where the inter-application validation tool 40 examines the selected application-to-application call to determine if the call contains one or more data attributes. In accordance with the convention used in constructing the sequence diagrams of the analysis and data ICD documents, the alphanumeric character "(" indicates the start of a string of one or more data attributes while the alphanumeric character ")" indicates the end of a string of one or more data attributes. Accordingly, at step 82, the inter-application validation tool 40 examines the call to determine if it contains both of the aforementioned characters in the sequence "(,)" If the inter-application validation tool 40 determines that the call fails to have this character sequence, the inter-application validation tool 40 concludes that the call does not contain a data attribute and the method will proceed to step 88 for further processing. If, however, the inter-application validation tool 40 determines that the call has this character sequence, the inter-application validation tool 40 concludes that the call contains at least one data attribute and the method proceeds to step 83 where a first data attribute of the attributes included in the selected call is examined.

To select the first data attribute of the selected call, the inter-application validation tool 40 scans the data attribute portion of the selected call for the occurrence of the character string ": string" used to indicate the end of a data attribute. The occurrence of this string indicates that the preceding characters (either to the prior occurrence of the character string ": string" or the character "(" indicating the start of the data attributes portion is the name of a data attribute. For example, the call 116-1 has one data attribute, more specifically, the data attribute "sourceSystemOrderId." Conversely, the call 116-6 has three data attributes, more specifically, the data attributes "errorDescription", "statusCode" and "sourceSystemOrderId". Finally, if the inter-application validation tool 40 identifies the occurrence of the character string "details" in the data attributes portion of the call, the inter-application validation tool 40 will review a details portion (not shown) of the ICD document being analyzed for a detail having a name matching the name of the detail identified in the data attributes portion of the call. The matching detail will be comprised of a group of data attributes. The inter-application validation tool 40 will then treat each data attribute contained in the matching detail of the details portion of the ICD document as if it was contained in the data attributes portion of the call and proceed in the manner hereinabove described to select a first data attribute.

After selecting a first data attribute at step 83, the method proceeds to step 84 where the inter-application validation tool 40 determines if there is an existing row in the data attribute matrix under construction which corresponds to the selected data attribute. If there is not an existing row in the data attribute matrix under construction which corresponds to the selected data attribute, the method proceeds to step 86 where a row is added, to the data attribute matrix under construction, for the selected data attribute. For example, for the first selected call, "submitCancelOrder(sourceSystemOrderId)", the selected data attribute would be "sourceSystemOrderId" and, since there are not yet any rows for the selected data attribute, a row for this data attribute would be added to the data attribute matrix being constructed.

Upon adding a row to the data attribute matrix for the selected data attribute at step 86 or upon determining, at step 84, that there is an existing row in the data attribute matrix for the selected data attribute, the method proceeds to step 88 where the inter-application validation tool 40 determines both the target application of the selected call and the message forming part of the call. For example, for the call 116-1, the target application of the call is the application for which the iconic representation thereof is aligned with the head of the iconic representation of the call, i.e., the application 12b, and the message is "submitCancelOrder." The inter-application validation tool 40 then adds a column to the data attribute matrix under construction for the target/message of the selected call. For example, for the call 116-1, the column added to the data attribute matrix under construction would be "application 12b/submitCancelOrder."

Upon adding a new column to the data attribute matrix at step 88, the method proceeds to step 90 where the inter-application validation tool 40 marks the newly added column of the data attribute matrix under construction to indicate the presence of the selected attribute in the message to the target application. For example, for the selected call 116-1, the column "application a/submitCancelOrder" would be marked along row "sourceSystemId." The method then proceeds on to step 92 where the inter-application validation tool 40 determines if the selected data attribute is the last data attribute for the selected call. If it is determined at step 92 that there are additional data attributes for the selected call, the method proceeds to step 94 for selection of a next data attribute of the selected call and then returns to step 84 for further processing of the newly selected data attribute in the manner previously described. If, however, it is determined at step 92 that the selected data attribute is the last data attribute for the selected call, the method will instead proceed to step 96 where the inter-application validation tool 40 determines if the selected call is the last call for the selected sequence diagram. If it is determined at step 96 that there are additional calls for the selected sequence diagram, the method proceeds to step 98 for selection of a next call for the selected sequence diagram and then returns to step 78 for further processing of the newly selected call in the manner previously described.

If, however, it is determined at step 96 that the selected call is the last call for the selected sequence diagram, the method proceeds to step 100 where the inter-application validation tool 40 concludes that construction of the data attribute matrix for the selected sequence diagram is complete. The method then proceeds to step 102 for determination as to whether the selected sequence diagram is the last sequence diagram for the ICD document being examined. If there are additional sequence diagrams in the ICD document to be examined, the method proceeds to step 104 for selection of a next sequence diagram from the ICD document and then returns to step 74 for generation of a data attribute matrix for the next selected sequence diagram in the manner previously described. Once constructed, the inter-application validation tool 40 may generate a display of the constructed data attribute matrix or matrices on a monitor or similar device for subsequent analysis in the manner more fully described below.

Of course, the foregoing description was directed to a method for analyzing an ICD document modeling an integrated enterprise such as the integrated enterprise 10. However, the process would differ slightly if only a selected portion of the document modeling the integrated enterprise was examined. For example, if only a single sequence diagram, for example, the sequence diagram 114, was to be analyzed, steps 102 and 104 would be omitted and analysis of the data attribute matrix 118 would commence upon completion of the construction thereof. Conversely, if the inter-application validation tool 40 were to be used to analyze only a selected set of calls of the selected sequence diagram, rather than selecting a first call at step 76, the set of calls would be selected at step 76. Similarly, rather than determining at step 96 if the last call for the selected sequence diagram had been processed, the method would determine if the last call of the selected set of calls had been processed. It is further contemplated that, when selecting sets of calls for analysis, the user would typically select sets of calls which are expected to have identical sets of data attributes associated therewith.

Returning momentarily to step 102, upon determining that data attribute matrices have been constructed for each sequence diagram of the ICD document, the method proceeds to step 106 where the constructed data matrices for the ICD document are analyzed and, based upon the analysis thereof, inaccuracies in the ICD document may be readily identified. For example, a first call in which a first target application receives a message may be compared to a second call in which the first target application sends the received message to a second target application. In this scenario, the first and second calls should have the same set of data attributes and, if the data attributes of the first call differs from the data attributes of the second call, an error has been identified in the ICD document being analyzed.

After completing an analysis of the constructed data attribute matrices at step 106, the method proceeds to step 108 where the ICD document is revised to correct the inaccuracies identified in step 108. A typical revision to the ICD document contemplated herein would be to add, delete or revise one or more of the data attributes which form part of the calls set forth in the various sequence diagrams of the ICD document. As with the construction thereof, the ICD document is revised using the UML modeling tool 32. Upon applying the inter-application validation tool 42 to the ICD document, analyzing the results of the data attribute matrices produced thereby to identify improper associations of data attributes with calls and revising the ICD document to remove such improper associations, the ICD document may be deemed as having been validated by the inter-application validation tool 42. Furthermore, by revising the ICD document to remove inaccuracies therein, the quality of the model of the integrated enterprise 10 being constructed is enhanced. As a result, when the integrated enterprise 10 is constructed using the ICD document and other modeling documents as a guide, the likelihood of errors occurring during the testing and/or operation of the integrated enterprise 10 is reduced. In particular, when used in the manner herein describe, the inter-application validation tool 40 reduces the likelihood of errors occurring within the integrated enterprise 10, for example, during the testing and/or operation thereof, when asked to perform a task which involves an interaction between first and second applications thereof.

Thus, there has been described and illustrated herein, an inter-application validation tool suitable for use in constructing a model of an integrated enterprise. By analyzing application-to-application calls for a model of an enterprise on an attribute-by-attribute basis, the inter-application validation tool may be used to identify errors, particularly those located within data rich application-to-application operations, within the model. However, those skilled in the art should recognize that numerous modifications and variations may be made in the techniques disclosed herein without departing substantially from the spirit and scope of the invention. Accordingly, the scope of the invention should only be defined by the claims appended hereto.

The invention claimed is:

1. For an integrated enterprise having, at least two applications, tangibly embodied on a computer readable medium executing on a computer, coupled together by an enterprise application integration system, a tool for analyzing inter-application calls between said at least two applications of said integrated enterprise, comprising: means for selection at least two inter-application calls for analysis thereof; and means for generating a data attribute matrix for said at least two inter-application calls; wherein a row of said data attribute matrix is assigned to each data attribute contained in at least one of said at least two inter-application calls and a column of said data attribute matrix is assigned to each one of said at least two inter-application calls; and means for marking said data attribute matrix to indicate which data attributes are contained in each one of said at least two inter-application calls; and means for generating and displaying on a graphical display of said data attribute matrix marked to indicate which data attributes are contained in each one of said at least two inter-application calls.

2. For an integrated enterprise having at least two applications, tangibly embodied on a computer readable medium executing on a computer, coupled together by an enterprise application integration system, a tool for analyzing, inter-application calls between said at least two applications of said integrated enterprise, comprising: means for selecting at least two inter-application calls for analysis thereof; and means for generating a data attribute matrix for said at least two inter-application, calls; wherein a row of said data attribute matrix is assigned to each data attribute contained in at least one of said at least two inter-application calls and a column of said data attribute matrix is assigned to each one of said at least two inter-application calls; and means for marking said data attribute matrix to indicate which data attributes are contained in each one of said at least two inter-application calls; and means for generating and displaying on a graphical display of said data attribute matrix marked to indicate which data attributes are contained in each one of said at least two inter-application calls; wherein said tool for analyzing inter-application calls between said at least two applications of said integrated enterprise is encoded in software which resides within a computer system.

3. A method of analyzing inter-application calls tangibly embodied on a computer readable medium executing on a computer, comprising: selecting at least two inter-application calls; identifying at least one data attribute contained in at least one of said selected inter-application calls; for each one of said selected inter-application calls, establishing an association between said selected inter-application call and said data attributes identified as being contained in said inter-application call; comparing associations to data attributes established for a first one of said selected inter-application calls to associations to data attributes established for a second Age-_ of said selected inter-application calls, and identifying errors in said first and second ones of said selected inter-application calls based upon said comparison of associations to data attributes established for said first one of said selected inter-application calls to associations to data attributes established for said second one of said selected inter-application calls; wherein establishing for each one of said selected inter-application calls, an association between said selected inter-application call and said data attributes identified as being contained in said inter-application call further comprises: for each one of said identified data attributes, establishing an association between said data attribute and all of said selected inter-application calls in which said data attribute is contained; wherein, for each one of said selected inter-application calls, said association between said selected inter-application call and said data attributes identified as being contained in said inter-application call is produced by said establishment, for each one of said identified data attributes, of said association between said data attribute and all of said selected inter-application calls in which said data attribute is contained; and wherein establishing, for each one of said identified data attributes, an association between said data attribute and all of said selected inter-application calls in which said data attribute is contained further comprises: generating a matrix having a plurality of rows and a plurality of columns; each one of said plurality of rows assigned to one of said at least one data attribute identified as being contained in at least one of said selected inter-application calls; each one of said plurality of columns assigned to one of said at least one selected inter-application calls and storing the matrix and associated data on a computer readable medium.

4. The method of claim 3, and further comprising correcting said identified errors in said first and second ones of said selected inter-application calls.

5. The method of claim 4, wherein said first inter-application call has a first set of data attributes contained therein and said second inter-application call has a second set of data attributes contained therein and wherein correcting said identified errors in said first and second ones of said selected inter-application calls further comprises:
modifying said first and second inter-application calls such that said first set of data attributes contained in said first inter-application call matches said second set of data attributes contained in said second inter-application call.

6. The method of claim 5, wherein modifying said first and second inter-application calls further comprises adding at least one data attribute to said first inter-application call.

7. The method of claim 5, wherein modifying said first and second inter-application calls further comprises adding at least one data attribute to said second inter-application call.

8. The method of claim 5, wherein modifying said first and second inter-application calls further comprises removing at least one data attribute from said first inter-application call.

9. The method of claim 5, wherein modifying said first and second inter-application calls further comprises removing at least one data attribute from said second inter-application call.

10. The method of claim 3, wherein the association between said selected inter-application call and said data attributes identified as being contained in said inter-application call is depicted in an interface control document ("ICD").

11. The method of claim 10, wherein the ICD is generated by a universal modeling language ("UML") tool.

12. The method of claim 3, wherein the comparison of associations to data attributes established for a first one of said selected inter-application calls to associations to data attributes established for a second one of said selected inter-application calls; and the identification of errors in said first and second ones of said selected inter-application calls based upon said comparison of associations to data attributes established for said first one of said selected inter-application calls to associations to data attributes established for said second one of said selected inter-application calls are performed by an analysis data validation tool.

13. The method of claim 3, wherein the matrix is produced by an inter-application validation tool.

14. A method of analyzing inter-application calls tangibly embodied on a computer readable medium executing on a computer, comprising: selecting at least two inter-application calls; identifying at least one data attribute contained in at least one of said selected inter-application calls; for each one of said selected inter-application calls, establishing an association between said selected inter-application call and said data attributes identified as being contained in said inter-application call; comparing associations to data attributes established for a first one of said selected inter-application calls to associations to data attributes established for a second one of said selected inter-application calls: and identifying errors in said first and second ones of said selected inter-application calls based upon said comparison of associations to data attributes established for said first one of said selected inter-application calls to associations to data attributes established for said second one of said selected inter-application calls: wherein establishing, for each one of said selected inter-application calls, an association between said selected inter-application call and said data attributes identified as being contained in said inter-application call further comprises: for each one of said identified data attributes, establishing an association between said data attribute and all of said selected inter-application calls in which said data attribute is contained: wherein, for each one of said selected inter-application calls, said association between said selected inter-application call and said data attributes identified as being contained in said inter-application call is produced by said establishment, for each one of said identified data attributes, of said association between said data attribute and all of said selected inter-application calls in which said data attribute is contained; and wherein establishing, for each one of said identified data attributes, an association between said data attribute and all of said selected inter-application calls fn which said data attribute is contained further comprises: generating a matrix having a plurality of rows and a plurality of columns: each one of said plurality of rows assigned to one of said at least one data attribute identified as being contained in at least one of said selected inter-application calls: each one of said plurality of columns assigned to one of said at least one selected inter-application calls: and for each one of said plurality of rows, marking said row at the intersection thereof with each one of said plurality of columns assigned to an inter-application call previously identified as containing said data attribute to which said row was assigned and storing the matrix and associated data on a computer readable medium.

15. The method of claim 14, wherein the association between said selected inter-application call and said data attributes identified as being contained in said inter-application call is depicted in an interface control document ("ICD").

16. The method of claim 15, wherein the ICD is generated by a universal modeling language ("UML") tool.

17. The method of claim 14, wherein the comparison of associations to data attributes established for a first one of said selected inter-application calls to associations to data attributes established for a second one of said selected inter-application calls; and the identification of errors in said first and second ones of said selected inter-application calls based upon said comparison of associations to data attributes established for said first one of said selected inter-application calls to associations to data attributes established for said second one of said selected inter-application calls are performed by an analysis data validation tool.

18. The method of claim 14, wherein the matrix is produced by an inter-application validation tool.

* * * * *